US008140491B2

(12) United States Patent
Mandagere et al.

(10) Patent No.: US 8,140,491 B2
(45) Date of Patent: Mar. 20, 2012

(54) STORAGE MANAGEMENT THROUGH ADAPTIVE DEDUPLICATION

(75) Inventors: Nagapramod Mandagere, San Jose, CA (US); Mark A. Smith, Los Gatos, CA (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/411,902

(22) Filed: Mar. 26, 2009

(65) Prior Publication Data

US 2010/0250501 A1    Sep. 30, 2010

(51) Int. Cl.
G06F 7/04 (2006.01)
G06F 17/00 (2006.01)
(52) U.S. Cl. ....................... 707/692; 707/697
(58) Field of Classification Search .............. 707/692, 707/697–699; 706/20
See application file for complete search history.

(56) References Cited

U.S. PATENT DOCUMENTS

| | | | |
|---|---|---|---|
| 4,215,402 A | 7/1980 | Mitchell et al. | |
| 5,627,748 A | 5/1997 | Baker et al. | |
| 5,990,810 A * | 11/1999 | Williams | 341/51 |
| 7,200,604 B2 | 4/2007 | Forman et al. | |
| 7,519,635 B1 * | 4/2009 | Haustein et al. | 1/1 |
| 7,814,149 B1 * | 10/2010 | Stringham | 709/203 |
| 7,844,581 B2 * | 11/2010 | Dubnicki et al. | 707/693 |
| 2002/0123995 A1 | 9/2002 | Shibuya | |
| 2006/0059207 A1 | 3/2006 | Hirsch | |
| 2007/0177739 A1 | 8/2007 | Ganguly et al. | |
| 2007/0255758 A1 | 11/2007 | Zheng et al. | |
| 2008/0013830 A1 * | 1/2008 | Patterson et al. | 382/173 |
| 2008/0034268 A1 | 2/2008 | Moore et al. | |
| 2008/0133561 A1 | 6/2008 | Dubnicki et al. | |
| 2008/0294696 A1 * | 11/2008 | Frandzel | 707/200 |
| 2009/0013129 A1 | 1/2009 | Bondurant | |
| 2009/0177855 A1 | 7/2009 | Drews | |
| 2009/0182789 A1 * | 7/2009 | Sandorfi et al. | 707/204 |
| 2009/0204636 A1 * | 8/2009 | Li et al. | 707/103 Y |
| 2009/0228680 A1 * | 9/2009 | Reddy et al. | 711/216 |

(Continued)

OTHER PUBLICATIONS

A. Z. Broder, "Identifying and Filtering Near-Duplicate Documents". Combinatorial Pattern Matching: 11th Annual Symposium, 2000, pp. 1-10.
F. Douglis and A. Iyengar, "Application-specific Delta-encoding via Resemblance Detection". USENIX Annual Technical Conference, 2003, pp. 1-14.
J. MacDonald, "File System Support for Delta Compression". Master's thesis, University of California, Berkley, 2000, pp. 1-32.

(Continued)

*Primary Examiner* — James Trujillo
*Assistant Examiner* — Jeffrey A Burke
(74) *Attorney, Agent, or Firm* — Kenneth L. Sherman, Esq.; Michael Zarrabian, Esq.; Myers Andras Sherman & Zarrabian LLP

(57) ABSTRACT

One embodiment retrieves a first portion of a plurality of stored objects from at least one storage device. The embodiment further performs a base type deduplication estimation process on the first portion of stored objects. The embodiment still further categorizes the first portion of the plurality of stored objects into deduplication sets based on a deduplication relationship of each object of the plurality of stored objects with each of the estimated first plurality of deduplication chunk portions. The embodiment further combines deduplication sets into broad classes based on deduplication characteristics of the objects in the deduplication sets. The embodiment still further classifies a second portion of the plurality of stored objects into broad classes using classifiers. The embodiment further selects an appropriate deduplication approach for each categorized class.

20 Claims, 7 Drawing Sheets

U.S. PATENT DOCUMENTS

| | | | |
|---|---|---|---|
| 2009/0276454 A1 | 11/2009 | Smith | |
| 2010/0064166 A1* | 3/2010 | Dubnicki et al. | 714/4 |
| 2010/0088296 A1* | 4/2010 | Periyagaram et al. | 707/705 |
| 2010/0153375 A1* | 6/2010 | Bilas et al. | 707/723 |
| 2010/0198797 A1* | 8/2010 | Wideman | 707/692 |
| 2010/0306412 A1* | 12/2010 | Therrien et al. | 709/247 |
| 2011/0099351 A1* | 4/2011 | Condict | 711/216 |

OTHER PUBLICATIONS

C. Policroniades and I. Pratt, "Alternatives for Detecting Redundancy in Storage Systems Data". Proceedings of the General Track: 2004 USENIX Annual Technical Conference, Boston, MA, USA, Jun. 27-Jul. 2, 2004. USENIX Association, pp. 1-15.

L. You and C. Karamanolis, "Evaluation of Efficient Archival Storage Techniques". 21st IEEE/12th NASA Goddard Conference on Mass Storage Systems and Technologies, 2004, pp. 1-6.

L. You, K. Pollack and D. Long, "Deep Store: An Archival Storage System Architecture". 21st International Conference on Data Engineering, 2005, pp. 1-12.

J. MacDonald, D. Korn, J. Mogul, K. Vo, "The VCDIFF Generic Differencing and Compression Data Format", Internet-Draft, Nov. 9, 2001, pp. 1-29.

NEC Corporation, HYDRAstor: New Architecture for Disk-based Backup, GlassHouse Whitepaper, 2007, pp. 1-15.; http://www.nec.co.jp/products/istorage/whitepaper/file/hydra_backup.pdf, Glass House Technologies, Inc., United States.

International Search Report and Written Opinion dated Apr. 8, 2011 for International Application No. PCT/EP2011/050143 from European Patent Office, filed Jan. 7, 2011, pp. 1-7, Rijswijk, Netherlands.

Constantinescu, C., "Compression for Data Archiving and Backup Revisited," Proceedings of SPIE, vol. 7444, SPIE, 2009, pp. 74440C-1-74440C-12, United States.

Meister, D. et al., "Multi-Level Comparison of Data Deduplication in a Backup Scenario," Proceedings of SYSTOR 2009: The Israeli Experimental Systems Conference, ACM, 2009, pp. 1-12, New York, United States.

B. Zhu, et al., "Avoiding the disk bottleneck in the data domain deduplication file system," USENIX Conference on File and Storage Technologies, FAST '08: 6th, 2008, pp. 269-282, United States.

Data Domain, Data domain SISL, Scalability Architecture, Technical report, May 2007, pp. 1-6, Santa Clara, CA, United States.

S. Balachandran, et al., "Sequence of hashes compression in data de-duplication," 2008 Data Compression Conference, Mar. 2008, (Abstract only), United States.

Tridgell, J.M. Andrew, xdelta, downloaded at: http://xdelta.org/, 2008, printed Oct. 30, 2009, 21 pages, United States.

Barham P., et al., "Xen and the Art of Virtualization", Proceedings of the 19th ACM symposium on Operating Systems Principles (SOSP '03), Oct. 2003, pp. 164-177, ACM Press, New York, United States.

Clark, B. et al., "Xen and the Art of Repeated Research", USENIX Annual Technical Conference, FREENIX Track, 2004, pp. 135-144, United States.

Gilmore, J., "Tar-GNU Project—Free Software Foundation (FSF)", located at: http://www.gnu.org/software/tar/, 2008, printed Oct. 30, 2009, 10 pages, United States.

Hitz, D, et al., "File System Design for an NFS File Server Appliance," 1994 Winter USENIX, 1994, pp. 235-246, United States.

Gailly, J. and Adler, M., "The GZIP home page," downloaded at: http://www.gzip.org/, 2004, printed Oct. 30, 2009, 9 pages, United States.

Kolivas, C., "Long Range ZIP or Lzma RZIP," downloaded at: http://ck.kolivas.org/apps/lrzip/README, Mar. 2008, printed Oct. 30, 2009, 7 pages, United States.

Kulkarni, P. et al., "Redundancy Elimination Within Large Collections of Files", In USENIX Annual Technical Conference, 2004, pp. 59-72, United States.

Alvarez, C., "NetApp Deduplication for FAS and V-Series Deployment and Implementation Guide", NetApp Technical Report TR-3505-0309, Mar. 2009, pp. 1-40, United States.

Park, K. et al., "Supporting Practical Content-Addressable Caching with CZIP Compression", In USENIX 2007 Annual Technical Conference, 2007, pp. 185-198, United States.

Policroniades, C. et al., "Alternatives for Detecting Redundancy in Storage Systems Data", Proceedings of the USENIX Annual Technical Conference, Jun. 2004, pp. 73-86, United Kingdom.

Primmer, R. et al., "Collision and Preimage Resistance of the Centera Content Address", EMC Corporation Technical Report, Jun. 2005, pp. 1-10, United States.

Quinlan, S. et al., "Venti: a new approach to archival storage", FAST 2002 Conference on File and Storage Technologies, Jan. 2002, pp. 89-102, United States.

Rabin, M. O., "Fingerprinting by Random Polynomials", Center for Research in Computing Technology, Harvard University, Technical Report TR-15-81, 1981, pp. 1-12, United States.

Reed, B. et al., "Security Considerations When Designing a Distributed File System Using Object Storage Devices", IEEE Security in Storage Workshop, Dec. 2002, pp. 24-34, United States.

Rosenblum, M., et al., "Virtual Machine Monitors: Current Technology and Future Trends", Computer, May 2005, pp. 39-47, vol. 38, No. 5, IEEE Computer Society, United States.

Seward, J., "bzip2 and libbzip2", downloaded at: http://www.bzip.org/, 2007, printed Nov. 2, 2009, 1 page, United States.

Smith, J.E,. et al., "The Architecture of Virtual Machines", Computer, May 2005, pp. 32-38, vol. 38, No. 5, IEEE Computer Society, United States.

Sugerman, J., et al., "Virtualizing I/O Devices on VMware Workstation's Hosted Virtual Machine Monitor", USENIX Annual Technical Conference, General Track, Jun. 2001, pp. 1-15, United States.

Tang, J.C., et al., "Exploring Patterns of Social Commonality Among File Directories at Work", Proceedings of the SIGCHI conference, Apr.-May 2007, pp. 951-960, ACM, United States.

Tridgell, A., "Efficient Algorithms for Sorting and Synchronization", PhD Thesis, The Australian National University, Feb. 1999, pp. 1-115, Australia.

Tridgell, A., "rzip", downloaded at: http://rzip.samba.org/, 2004, printed Nov. 2, 2009, 3 pages, United States.

Villanueva, B., et al., "Providing Students 24/7 Virtual Access and Hands-On Training using VMware GSX Server", Proceedings of the 33rd Annual ACM SIGUCCS Conference on User Services, Nov. 2005, pp. 421-425, United States.

Waldspurger, C.A., "Memory Resource Management in VMware ESX Server", USENIX Association, Proceedings of 5th Symposium on Operating Systems Design, Dec. 2002, pp. 181-194, vol. 36, No. SI, United States.

Whitaker, A., et al., "Rethinking the Design of Virtual Machine Monitors", Computer, May 2005, pp. 57-62, vol. 38, No. 5, IEEE Computer Society, United States.

You, L., et al., "Evaluation of Efficient Archival Storage Techniques", 21st IEEE/12th NASA Goddard Conference on Mass Storage Systems and Technologies, Apr. 2004, pp. 227-232, United States.

You, L., et al., "Deep Store: An Archival Storage System Architecture", 21st International Conference on Data Engineering (ICDE'05), 2005, pp. 804-815, IEEE Computer Society, United States.

WIKIPEDIA.ORG, "gzip", downloaded from: http://en.wikipedia.org/wiki/Gzip, download date: May 27, 2009, 3 pages, United States.

WIKIPEDIA.ORG, "rzip", downloaded from: http://en.wikipedia.org/wiki/Rzip, download date: May 27, 2009, 3 pages, United States.

M. A. Smith, et al., "IZO: Applications of Large-Window Compression to Virtual Machine Management," 22nd Large Installation System Administration Conference (LISA '08), Nov. 2008, pp. 121-132, United States.

U.S. Non-Final Office Action for U.S. Appl. No. 12/137,462 mailed Nov. 16, 2010.

U.S. Final Office Action for U.S. Appl. No. 12/137,462 mailed May 12, 2011.

U.S. Notice of Allowance for U.S. Appl. No. 12/137,462 mailed Sep. 29, 2011.

* cited by examiner

File Cluster A          File Cluster B

STORAGE MANAGEMENT THROUGH ADAPTIVE DEDUPLICATION

BACKGROUND

1. Field of the Invention

The present invention relates generally to data storage, and in particular to managing storage of data objects through adaptive deduplication.

2. Background Information

Digitization of large volumes of data and an increase in richness of content of data have lead to high demands for online data storage requirements. One way to counter this issue is to add additional hardware resources. However, in the storage domain, addition of more storage often results in a disproportionate increase in the Total Cost of Ownership (TCO). Though the cost of acquisition has retreated as a result of reduction in hardware costs, the cost of management, which mainly consists of administration costs and power/energy costs, has increased. Many companies are attempting to provide a better solution by using data footprint reduction technologies such as deduplication.

Data deduplication removes or minimizes the amount of redundant data in the storage system by keeping only unique instances of the data on storage. Redundant data is replaced with a pointer to the unique data copy. By reducing space requirements, deduplication reduces the need for new storage resources. A good implementation of deduplication can often lead to substantial savings, both in terms new resource acquisition costs and management costs which include administration and energy costs, thereby leading to a significant reduction in TCO. In backup environments, deduplication can also lower the network bandwidth requirement for remote backups, replication and disaster recovery by reducing the amount of transmitted data on network.

Deduplication techniques can be classified into three major categories, namely: Whole File Hashing (WFH), Sub-File Hashing and Delta Encoding (DELTA). Sub-File Hashing can be further classified into Fixed Chunk Size Hashing (FSH) and Variable Chunk Size Hashing (VSH). Another less explored alternative is Content Aware Sub-File Hashing which can be further classified into Content Aware Fixed Size Hashing (CAFSH) and Content Aware Variable Size Hashing (CAVSH).

Different deduplication alternatives and parameters have different characteristics in terms of Metadata Overhead (MO, bookkeeping space for deduplication, including the hash table, the chunk list for each file, etc.), Folding Factor (FF, data reduction ratio without considering MO), Deduplication Time (DT, time for deduplicating data) and Reconstruction Time (RT, time for restoring the deduplicated data), for different types of data.

For example, in general $FF(WFH) < FF(FSH) < FF(VSH)$. However, in multi-user backup dataset, WFH works quite well for source code and system files, which implies that FSH and VSH are not necessary especially considering their high overhead and resource consumption. For some data files such as composite files (tar, iso etc.), content aware approaches (CAFSH and CAVSH) can improve the FF compared with corresponding content agnostic approaches (FSH and VSH). Considering MO, the following represents the overhead: $MO(WFH) < MO(FSH)$ and $MO(WFH) < MO(VSH)$. The smaller the fixed/average chunk size, the larger MO the FSH/VSH has. Content aware approaches have slightly larger MO than corresponding content agnostic approaches due to slightly more chunks.

In terms of deduplication time, in general: $DT(WFH) < DT(FSH) < DT(VSH)$. Content aware approaches have slightly larger DT than corresponding content agnostic approaches because of the format analysis.

For reconstruction time, in general: $RT(WFH) < RT(FSH)$ and $RT(WFH) < RT(VSH)$, where $RT(FSH)/RT(VSH)$ increases as the fixed/average chunk size decreases. Similarly, Content aware approaches have slightly larger RT than corresponding content agnostic approaches due to slightly more chunks.

Moreover, FSH, VSH, CAFSH, CAVSH also have different tunable parameters mainly used to control the (average) chunk size, which effect the FF, MO, DT and RT. In general, the smaller the fixed/average chunk size, the higher FF, the larger MO, and the longer DT and RT. However, the FF will not be improved with smaller chunk sizes for some files like mp3, etc.

Besides the selection of different deduplication approaches, another interesting and important design choice for a deduplication system is when and where to perform the deduplication—the architecture (timing and placement) of deduplication systems, in a distributed or network attached environments. There are three common architectures: 1) on-line deduplication at deduplication client side; 2) on-line deduplication at deduplication appliance or deduplication-embedded storage system side; and 3) off-line deduplication at deduplication appliance or deduplication-embedded storage system side. On-line means the data is deduplicated before transferring (client side) or writing to the storage (appliance or storage side). Off-line refers to first store the data in storage, and then perform the background deduplication on stored data. Different architectures have different tradeoffs on ingestion rate, network bandwidth requirement, storage requirement, CPU and I/O utilization, security impact, etc.

BRIEF SUMMARY

A method and system for adaptive deduplication of stored data objects. One embodiment involves retrieving a first portion of stored objects from at least one storage device. The embodiment further provides performing a base type deduplication estimation process on the first portion of stored objects. The embodiment still further provides resulting in an estimation first deduplication chunk portions of the first portion of stored objects. The method yet further provides categorizing the first portion of stored objects into deduplication sets based on a deduplication relationship of each object of the stored objects with each of the estimated first deduplication chunk portions. The method further provides combining deduplication sets into broad classes based on deduplication characteristics of the objects in deduplication sets. The method still further provides building classifiers for each class using metadata attributes and content attributes of each object of the first portion of stored objects and classifying a second portion of the stored objects into broad classes using the classifiers. The method further provides selecting an appropriate deduplication approach for each categorized class and using a chunk portion size threshold for narrowing down chunk size for Variable Chunk Size Hashing (VSH) if selected.

Another embodiment involves a system for adaptive deduplication of stored objects. The system includes a base deduplication module configured to perform a base deduplication process on a first portion of objects stored on at least one storage device resulting in an estimation of first deduplication chunk portions of the first portion of stored objects. The embodiment further provides a clustering module configured to categorize the first portion of the objects into deduplication sets based on a deduplication relationship of each object of the stored objects with each of the estimated first deduplication chunk portions. The embodiment still further provides a classifier module configured to combine deduplication sets into broad classes based on deduplication characteristics of the objects in deduplication sets, build classifiers for each class using metadata attributes and content attributes of each object of the plurality of objects, classify a second portion of the plurality of objects into broad classes using the classifiers. The embodiment further provides an adaptive deduplication module configured to select an appropriate deduplication approach for each categorized class, use a chunk portion size threshold for narrowing down chunk size for Variable Chunk Size Hashing (VSH) if selected.

Yet another embodiment involves a computer program product that causes a computer to retrieve a first portion of a plurality of stored objects from at least one storage device. The embodiment further provides causing the computer to perform a base type deduplication estimation process on the first portion of stored objects resulting in an estimation of a first plurality of deduplication chunk portions of the first portion of stored objects. The embodiment still further provides causing the computer to categorize the first portion of a plurality of stored objects into deduplication sets based on a deduplication relationship. The embodiment yet further provides causing the computer to combine deduplication sets into broad classes based on the deduplication characteristics of the objects in deduplication sets. The embodiment further provides causing the computer to build classifiers for each class using metadata attributes and content attributes of the first portion of the plurality of stored objects and classify a second portion of stored objects into broad classes using the classifiers. The embodiment still further provides causing the computer to select an appropriate deduplication approach for each categorized class and use a chunk portion size threshold for narrowing down chunk size for Variable Chunk Size Hashing (VSH) if selected.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
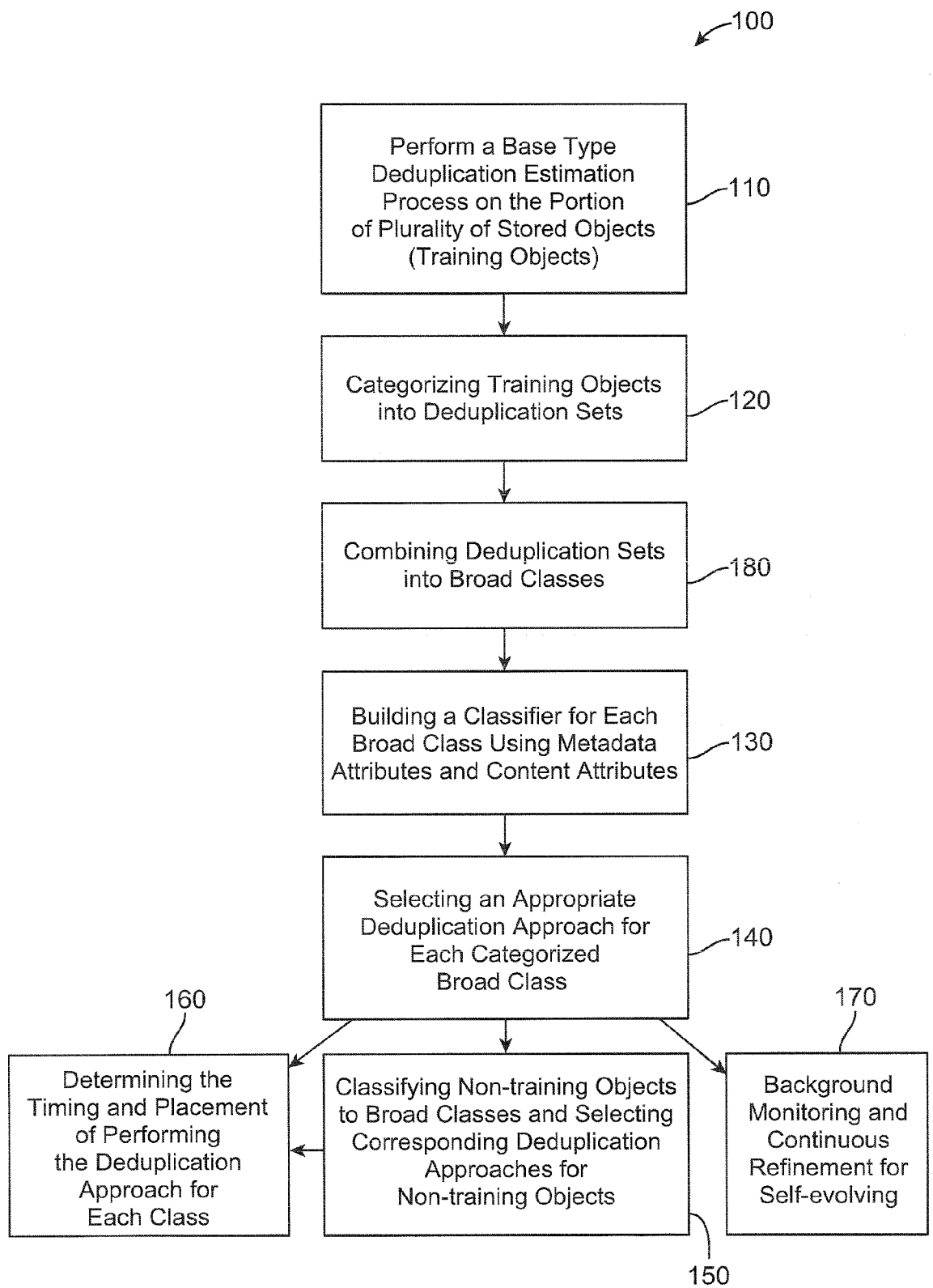
FIG. 1 illustrates a block diagram of a process for adaptive deduplication according to one embodiment of the invention.

The following description is made for the purpose of illustrating the general principles and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of managing stored objects through adaptive deduplication, as well as operation and/or component parts thereof. While the following description will be described in terms of deduplication processes and devices for clarity and to place the embodiments of the invention in context, it should be kept in mind that the teachings herein may have broad application to all types of systems, devices and applications.

One embodiment involves retrieving a portion of many stored objects from a storage device, performing a base type deduplication estimation process on the portion of stored objects, resulting in an estimation of first deduplication chunk portions of the portion of stored objects, categorizing the portion of the stored objects into deduplication sets based on a relationship of each object of the plurality of stored objects with each of the estimated first deduplication chunk portions, combining deduplication sets into broad classes based on the deduplication characteristics of the objects in deduplication sets, classifying each class based on metadata attributes and content attributes of each object of the many objects, selecting an appropriate deduplication process for each categorized class and using a chunk portion size threshold for narrowing down chunk size for Variable Chunk Size Hashing (VSH) if selected, and determining the timing and placement to perform each selected deduplication approach for each classified class based on the resource utilization of the approach, available system resource and SLA (service level agreement) requirement.

One embodiment involves retrieving a portion of many stored objects (called training objects) from a storage device, performing a base type deduplication estimation process on the training objects, resulting in an estimation of the deduplicated (non-redundant) chunks for the training objects, categorizing the training objects into deduplication sets based on a deduplication relationship which is the relationship of each object of the plurality of stored objects with each of the estimated deduplicated chunks, combining deduplication sets into broad classes based on the deduplication characteristics of the objects in deduplication sets, building classifier for each class using metadata attributes and content attributes of the training objects, selecting an appropriate deduplication approach for each categorized class, and using the super-block technique for narrowing down the chunk size for VSH; classifying non-training objects into broad classes using the built classifiers; and selecting the best timing and placement for performing selected deduplication based on the resource utilization of the selected deduplication approach, available system resource and SLA requirement.

FIG. 1 illustrates a block diagram of a process 100 for managing stored objects through adaptive deduplication. In one embodiment, process 100 includes two phases: a training phase and on-line phase. The training phase is applied to a small amount of (e.g. <10%) randomly selected objects from all stored objects, or just (part of) the currently available stored objects. In block 110, a base deduplication estimation process is performed on the portion of stored objects used for training. In one embodiment of the invention, the maximal redundancy is found using VSH (e.g., Rabin fingerprinting) with the minimum average chunk size. If two objects do not have duplicated chunks in block 110, the two objects will not have any duplication using other deduplication approaches. Therefore, a disjoint object set (called deduplication set) based on this base deduplication will not connect to another disjoint set even if other approaches are used for each set further in process 100.

For a composite file, the base deduplication is performed on each separated file internal to it. This is because, as a whole, the composite file may deduplicate with many other files, which will create very large file sets during clustering in block 120. In another embodiment of the invention, composite files are ignored if such files do not account for a large percentage of all of the stored files. The base deduplication performed in block 110 is an estimation. Therefore, in this embodiment of the invention, the resulting deduplicated chunks of the training objects are not stored.

In block 120, the training objects are categorized/clustered into deduplication sets based on a deduplication relationship which is the relationship of each object of the plurality of stored objects with each of the estimated deduplicated chunks.

Figure 2:
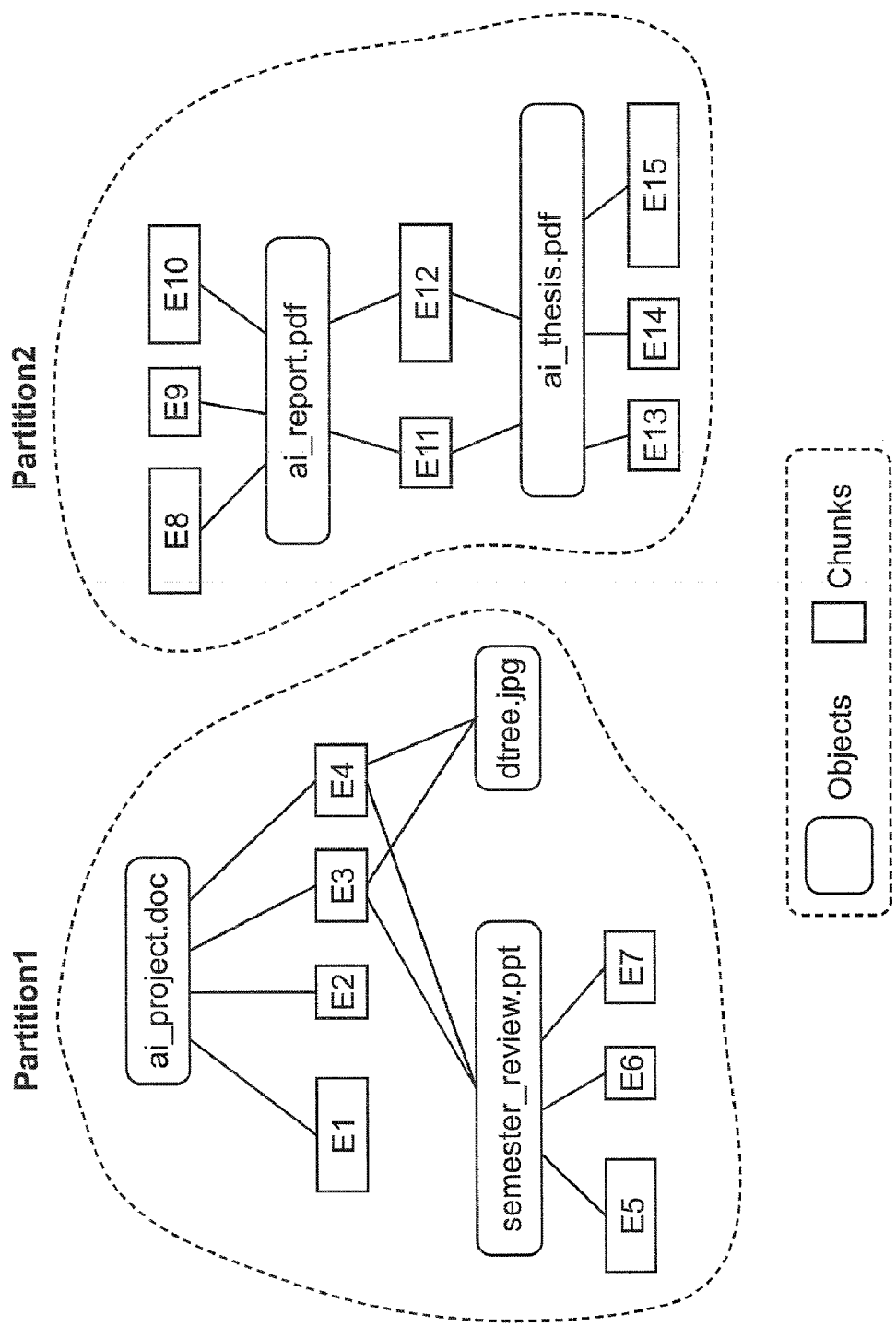
FIG. 2 illustrates an example of categorizing a portion of stored objects into deduplication sets according to an embodiment of the invention.

In one embodiment of the invention, the objects are categorized so that the objects in a deduplication set deduplicate among themselves and no cross-set redundancy occurs no matter which deduplication approach is used for each set. This is because if there were cross-set redundancy when different approaches were used, the categorization would have negative impact on FF. For training objects, a graph partitioning algorithm is applied on the base deduplication results to find the disjoint sets that do not share any duplicates (chunks). FIG. 2 illustrates an example graph partitioning for categorizing objects of disjoint deduplication sets.

Figure 3:
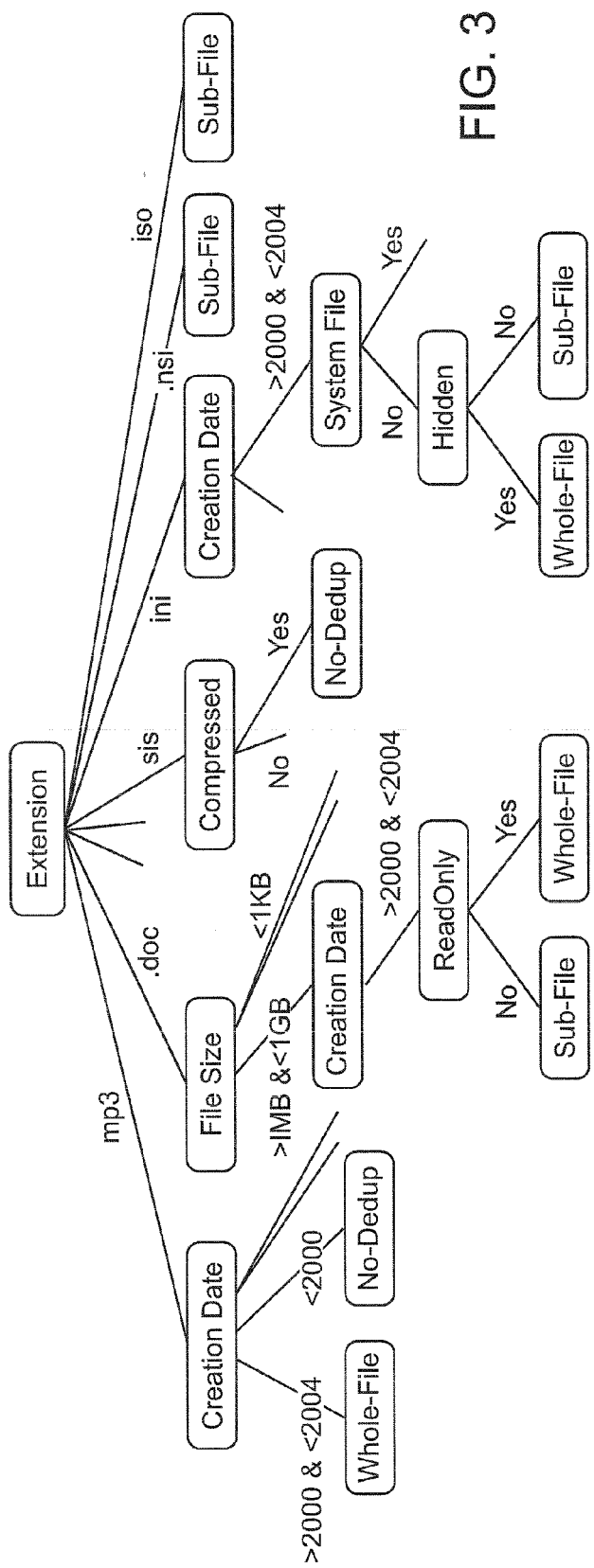
FIG. 3 illustrates an example of classifying objects to deduplication sets according to an embodiment of the invention.

After categorizing the objects into deduplication sets in block 120, process 100 combines deduplication sets into broad classes (e.g., No-dedup, WFH, VSH) based on the deduplication characteristics of the objects in deduplication sets in block 180, then process 100 continues with block 130 where a self-refining classifier is built for each class using metadata attributes and content attributes of each object of the stored objects. In this embodiment of the invention, metadata attributes (e.g. file type) and content attributes (e.g., bit rate of an .mp3 file) are highly correlated to the selection of deduplication approaches. The training objects are first divided into different sets using graph partitioning, and then grouped into broad classes. In one embodiment of the invention, a standard supervised learning technique is used, such as support vector machines (SVM) or decision trees, to build the classifiers for broad classes. FIG. 3 illustrates an example tree of resulting classifiers for broad classes using metadata and content attributes as the feature vector.

In block 140, an appropriate deduplication process is selected for each categorized class, and then the super-block technique is used for narrowing down the chunk size for VSH. In block 110, base deduplication was performed to get the best folding factor for all deduplication sets that provides the upper limit in terms of folding factor. One choice is to determine the most cost-effective approach for each deduplication set by sacrificing some FF to get much less DT and RT and low MO, if possible. For example, the smallest acceptable predetermined FF is selected, e.g. 90% of best the best FF. Then all approaches are performed for each set to find the appropriate deduplication approach that has the least DT and RT, and the lowest MO, and also satisfies the FF constraint.

However, trying all deduplication approaches for each set to find the best approach for each set is quite time consuming, impractical and unnecessary. In one embodiment of the invention, to dramatically reduce the search space, the sets are first combined into broad classes (e.g., No-dedup, WFH, VSH) based on the deduplication characteristics of the objects in deduplication sets.

Figure 4:
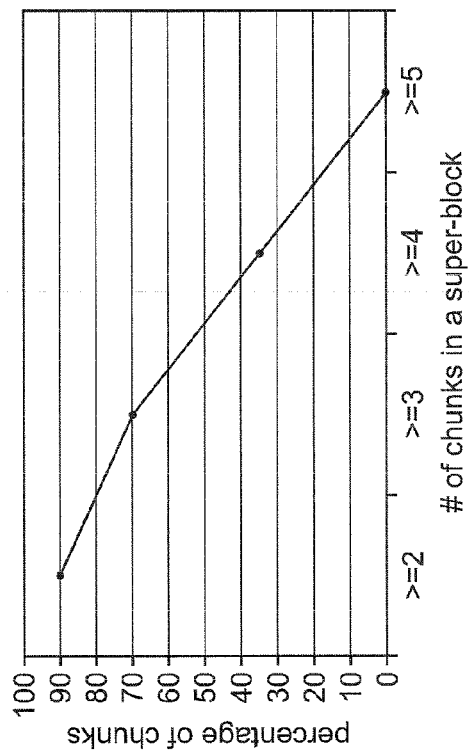
FIG. 4 illustrates a graph for percentage of chunks forming super-blocks containing different number of chunks according to an embodiment of the invention.

In another embodiment of the invention, a super-block technique is used to narrow down the parameter space for the VSH class. In this embodiment of the invention, all the super-blocks are found, and then the percentages of the chunks that form super-blocks containing $\geqq 2$ chunks, $\geqq 3$ chunks, $\geqq 4$ chunks, . . . , as shown in FIG. 4. Then, the desirable super-block size is determined based on a threshold for chunk percentage, for example, if a threshold=70%, super-block size $\geqq 3$ is selected based on the example in FIG. 4, which means 70% of all chunks determined from the base deduplication can be combined to super-blocks with $\geqq 3$ chunks. For this example, the fixed/average chunk size for VSH should be around 3*smallest size. A few chunk sizes around the estimated size is tried for VSH, and the most cost effective chunk size can then be determined.

In one embodiment of the invention, in the on-line phase, the classifiers built at the training phase (block 130) are applied to a new object or an existing non-training object, in block 150. If an object cannot be classified into a class based on the classifiers and the metadata/contents of the object e.g., a file has a type that is not shown in the training data), then deduplication is attempted on this object in each class and the class with maximum duplication is chosen as its home class.

The information on such objects can be further used to refine the classifiers after a sufficient number of such objects are accumulated. For a composite file, first the file is divided into separate files based on format, and then the classifiers are applied to each single file to find the broad class and best approach for each single file.

In one embodiment of the invention, after mapping an object to a broad class, the desired deduplication approach for this object is determined. In another embodiment of the invention, the best timing and placement for performing the deduplication is determined in block 160. The timing and placement decision can be made either at training phase or on-line phase, although at on-line phase the decision could be more dynamic and accurate. In this case, the decision is based on the resource utilization of the approach, the available system resources and SLA requirements. For example, if the approach has very short DT (e.g., WFH), the deduplication client side has enough CPU power and the network bandwidth is small, then the process 100 performs on-line client side deduplication. If the approach has reasonably short DT (e.g., VSH with large chunks) and the network bandwidth is not an issue, the process 100 performs on-line storage/appliance side deduplication. If the approach has long DT (e.g., VSH with small chunks), and the network and I/O bandwidth are high, off-line storage/appliance side deduplication is performed by process 100. In one embodiment of the invention, a timing and placement determinator is used for the determination of when and where in the system the selected deduplication approach is performed. In one embodiment of the invention, off-line storage/appliance side deduplication is performed for composite filed.

In one embodiment of the invention, in block 170 the process 100 performs on-line phase evolving determination of deduplication approach, timing and placement. In this embodiment of the invention, process 100 continuously monitors 1) whether the current decision for deduplication approach, timing and placement is a good decision for each class, 2) whether the estimated resource utilizations of different approaches are accurate, and 3) whether the classifier built using the training set is accurate, using background threads. In this embodiment of the invention, process 100 estimates the FF, MO, DT and RT of different deduplication approaches for each set, and if there is a better choice for a class than the current one over history, the better choice will replace the current choice. For a new incoming object to a class, the newly selected deduplication approach as well as timing and placement is used. In one embodiment of the invention, the new entering chunks and existing chunks are obtained using different chunking approaches, which will cause loss of duplicates compared with using the same chunking approach. In this embodiment of the invention, process 100 re-chunks the existing chunks for better redundancy reduction. Since re-chunking a large amount of objects is time consuming, in one embodiment of the invention, process 100 performs this in the background when the resources are available.

Figure 5:
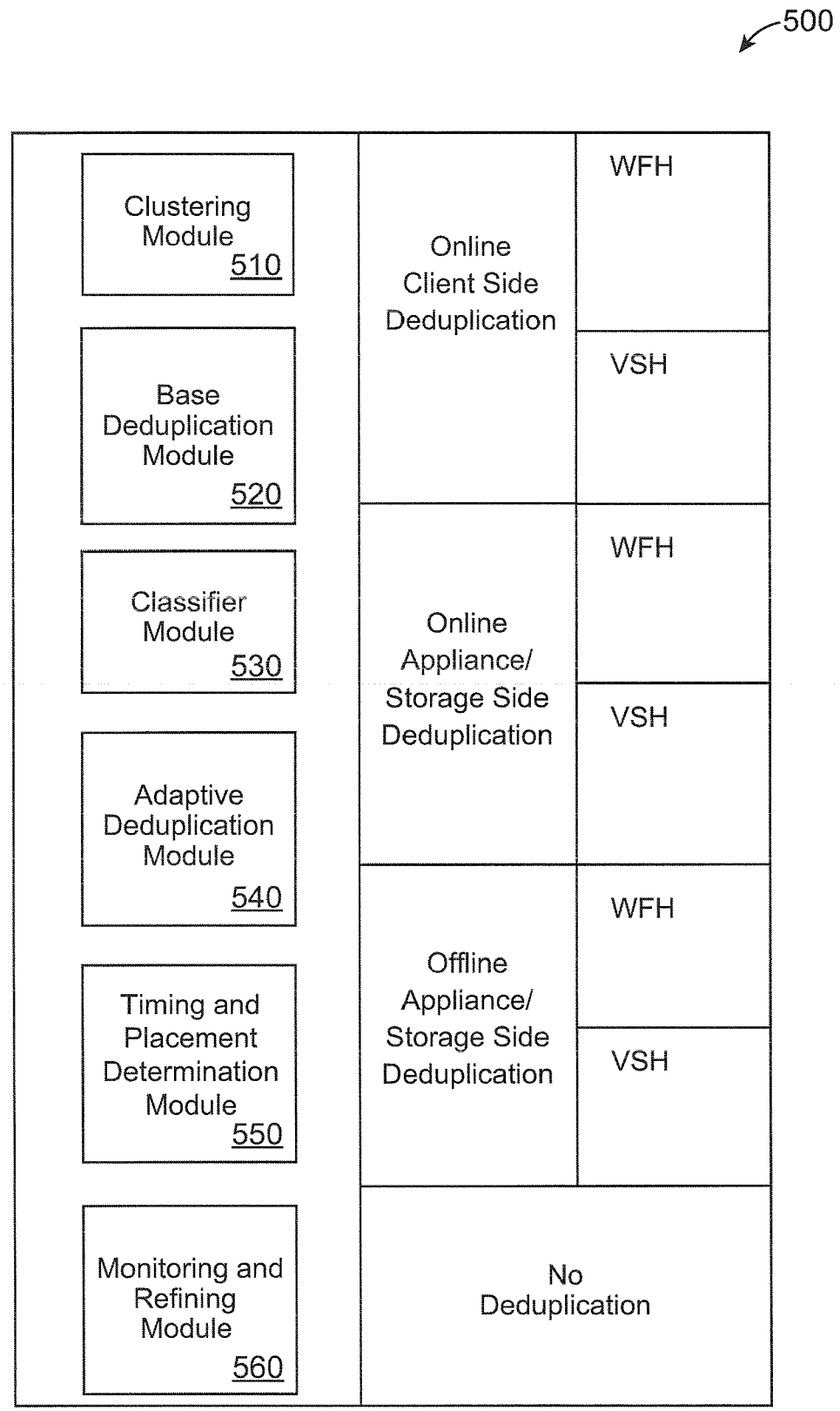
FIG. 5 illustrates an adaptive deduplication device according to an embodiment of the invention.

FIG. 5 illustrates the overall architecture of an adaptive deduplication apparatus according to one embodiment of the invention. In this embodiment of the invention, device 500 includes a clustering module 510, a base deduplication module 520, and a classifier module 530, an adaptive deduplication module 540, a timing and placement determination module 550 and a monitoring and refining module 560. In one embodiment of the invention, the training process uses base deduplication module 520 and clustering module 510 to generate deduplication sets, classifier module 530 to combine deduplication sets into broad classes based on the deduplication characteristics of the objects in deduplication sets and build the classifiers for broad classes, and deduplication estimators in adaptive deduplication module 540 to estimate the FF, MO, DT and RT of different VSH approaches to determine the best chunk size for VSH class. At on-line or training phase, adaptive deduplication module 540 uses the timing and placement determination module 550 to select when and where the desired deduplication is performed. At on-line phase, classifier module 530 classifies the non-training objects to broad classes for selecting appropriate deduplication approaches and monitoring and refining module 560 monitors deduplication history and performs rechunking at background for self-evolving.

As illustrated in FIG. 5, the base deduplication module 520 is configured to perform a base deduplication process on a training objects stored on at least one storage device, resulting in an estimation of deduplicated chunks. In one embodiment of the invention, the clustering module 510 is configured to categorize the training objects into deduplication sets based on a deduplication relationship. The classifier module 530 is configured to combine deduplication sets into broad classes based on the deduplication characteristics of the objects and build the classifier for each class using metadata attributes and content attributes of training objects at training phase, and classify the non-training objects to broad classes and self refine based on new information at on-line phase. The adaptive deduplication module 540 is configured to select an appropriate deduplication approach for each categorized class (e.g. No-dedup, WFH, VSH), and use the super-block technique for narrowing down the chunk size for VSH. The adaptive deduplication module 540 is further configured to use the timing and placement determination module 550 to select when and where the desired deduplication approach is performed. In one embodiment of the invention, device 500 is configured to run process 100 on the included modules.

In one embodiment of the invention, the monitoring and refining module 560 is configured to continuously monitor 1) whether the current decision for deduplication approach, timing and placement is a good decision for each class, 2) whether the estimated resource utilizations of different approaches are accurate, and 3) whether the classifier built using the training set is accurate, using background threads. In one embodiment of the invention, monitoring and rechunking module 560 estimates the FF, MO, DT and RT of different deduplication approaches for each class, and if there is a better (approach, timing and placement) choice for a class than the current one over history, the better choice will replace the current choice. For a new incoming object to a class, the newly selected deduplication approach as well as timing and placement is used. In one embodiment of the invention, monitoring and rechunking module 560 re-chunks the existing chunks using the new deduplication approach for better redundancy reduction in the background when the resources are available.

Figure 6:
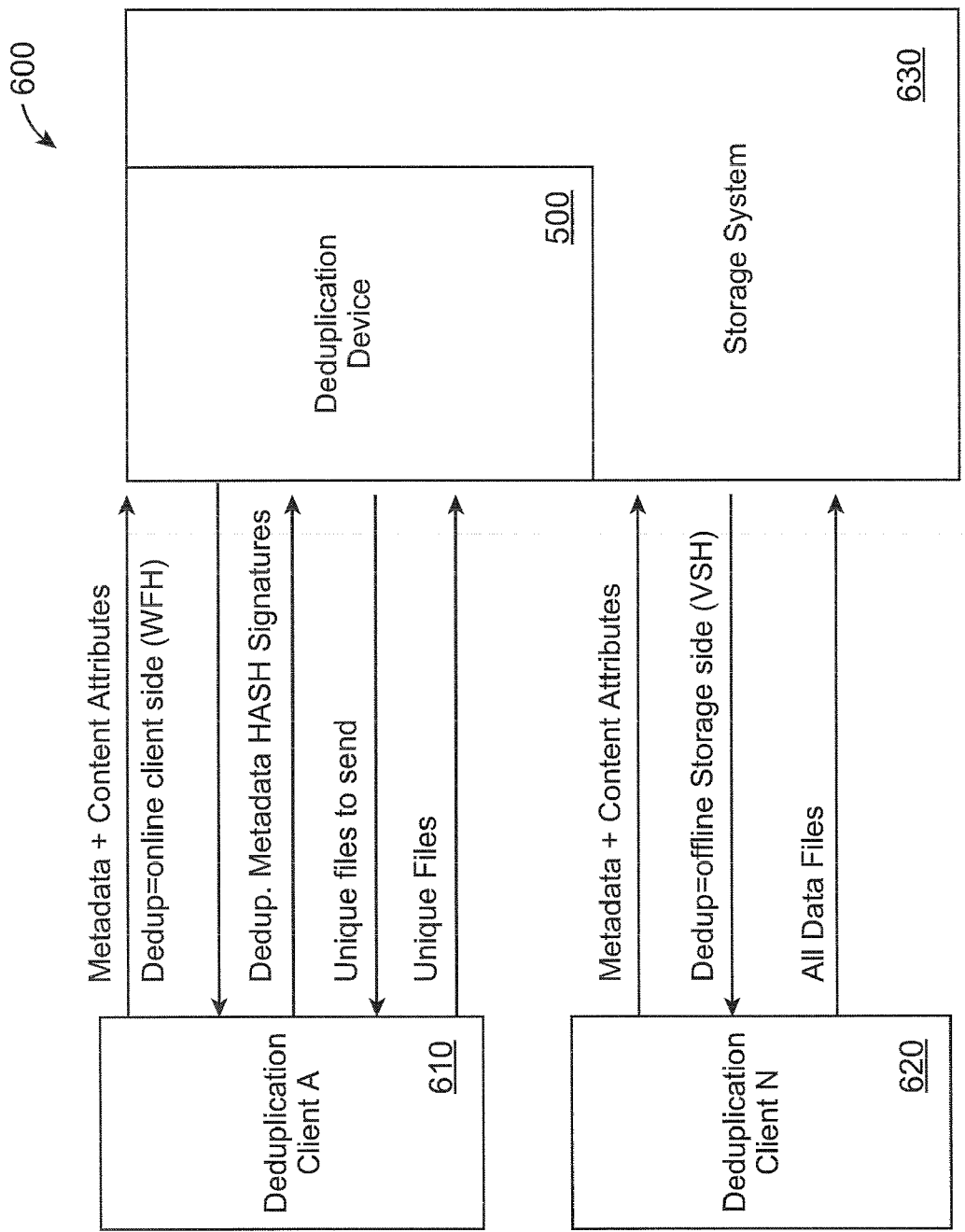
FIG. 6 illustrates an adaptive deduplication system according to an embodiment of the invention.
Figure 7:
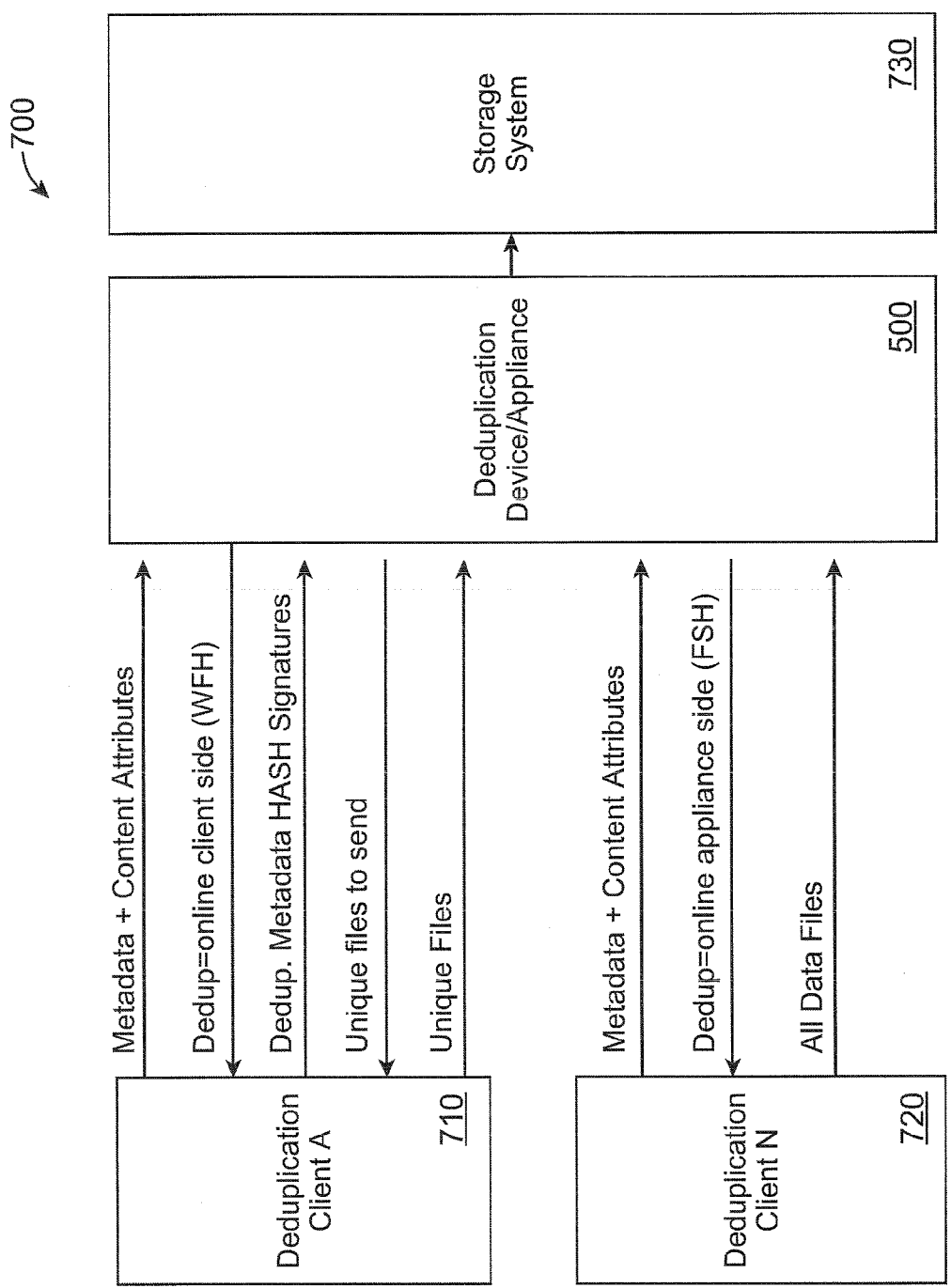
FIG. 7 illustrates another adaptive deduplication system according to an embodiment of the invention.

FIG. 6 and FIG. 7 illustrate two deduplication systems 600 and 700 including device 500. In one embodiment of the invention, the timing and placement determination module 550 is configured to determine to perform each selected deduplication approach for each class on either a client device (e.g., client A 610-N 620 or 710-720), a deduplication device (e.g., deduplication appliance 500), or at a storage device (e.g., storage system 630 or 730) in the system based on SLA requirement, use and availability of system resources required for each selected deduplication approach.

For the newly entering objects at the client side 610-620/710-720, the metadata and contents will be sent to the classifiers at the device 500 to find the best approach, and then the best timing and placement in the system 600/700 will be decided by the timing and placement determination module 550. The selected approach and architecture are fed back to the client system, and the corresponding action is taken.

In one embodiment of the invention, the system 600/700 is a distributed network including a plurality of storage device sub-systems. In this embodiment of the invention, the adaptive deduplication module 540 is further configured to perform the selected deduplication process on each classified broad class resulting in a distributed plurality of deduplication chunks for each storage device sub-system in the system 600/700.

In one embodiment, deduplication characteristics of data drives the categorization of the broad classes and the selection of the deduplication algorithm. In this embodiment, data is represented using a combination of file attributes and content attributes. In one embodiment, data is categorized based on its deduplication behavior into the following three classes: 1) data/files that do not deduplicate with any other files in the system, 2) data/files that only partially deduplicate with other files in the system, 3) data/files that completely deduplicate with other files in the system.

For data of type 1, application of deduplication is completely avoided thereby saving resources. For data of type 2, sub file chunking algorithms are selected. For type 3 a whole file deduplication technique is selected. In one embodiment, a training/learning phase is used to try to find a correlation/mapping between data, specifically the file and content attributes and the corresponding deduplication characteristics. In this embodiment, a learning engine module is responsible for partitioning a subset of data into broad classes based on deduplication characteristics followed by decision tree induction based on file and content attributes.

In one embodiment, the training process is divided into Base Deduplication, File/chunk Partitioning, File Categorizing and Classifications.

Base Deduplication

For the training data, the maximal redundancy (FF) is found by using VSH (Rabin fingerprinting) with the minimum average chunk size. In this embodiment, the rationale for doing this is that if two files do not have duplicated chunks under this approach, they will have no duplication using other deduplication approaches. Therefore, disjoint file sets based on this base deduplication will not connect to another disjoint set even if we use other approaches for each set later. For a composite file, the base deduplication is performed on each separated file inside it, because it, as a whole may deduplicate with many other files, which will create very large file sets during clustering. In one embodiment, composite files can just be ignored if such files do not account for a large percentage.

File/Chunk Partitioning

Figure 8:
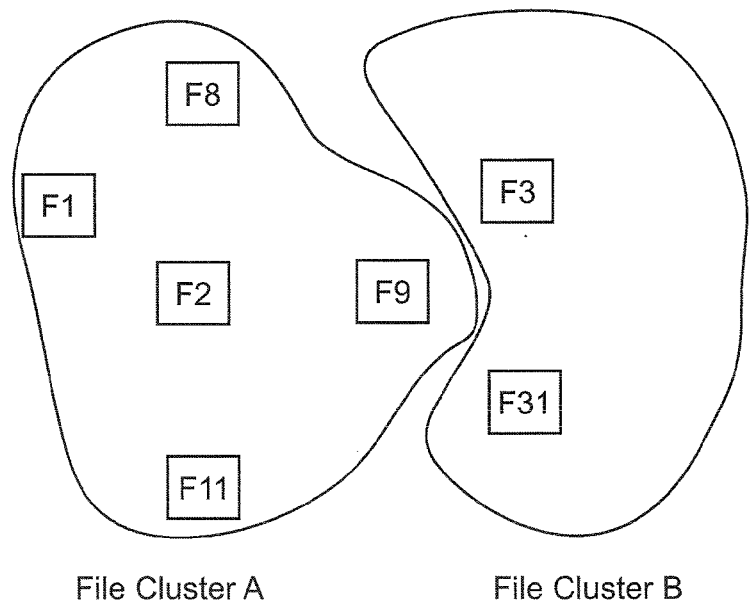
FIG. 8 illustrates the disjoint file sets for the example shown in FIG. 2 according to one embodiment of the invention.

For the training data, we apply a graph partitioning algorithm on the base deduplication results to find the disjoint deduplication sets which do not share any duplicates (chunks). The algorithm builds a graph of the training set. The files in the training set form the nodes of this graph and an edge in this graph represents a common chunk between two files or end nodes. It applies a Depth First Search to identify all disconnected components of this graph. FIG. 8 shows the disjoint file sets for the example shown in FIG. 2. In FIG. 8, only the "file" nodes in FIG. 2 are kept.

File Categorizing

Obviously, finding the best algorithms for each deduplication set by searching all algorithms (including different parameters) is very time consuming, impractical and unnecessary. In one embodiment, deduplication sets are categorized into three broad classes, namely No-Dedup, WFH and VSH, based on the deduplication characteristics of the objects.

No-Dedup

If a given partition has only one member/file, this file is classified as one that does not deduplicate with any other files in the system.

WFH

If a given partition has more than one member/file, the number of chunks that each member/file in the partition are examined. If this is same across the partition, all files in this partition are classified as those that deduplicate as whole files.

VSH

If a given partition has more than one member/file, and if each member has different number of chunks, all files in this partition are classified as those that deduplicate as sub files or partial duplicates.

For VSH class, the super-block technique is used to narrow down the parameter space. More specifically, all the super-blocks are found, and then the percentages of the chunks that form super-blocks containing $\geq 2$ chunks, $\geq 3$ chunks, $\geq 4$ chunks, . . . , as shown in FIG. 4 are determined. Then the desirable super-block size is determined based on the threshold for chunk percentage, for example, if threshold=70%, super-block size $\geq 3$ based on FIG. 4, which means 70% of all chunks got from the baseline can be combined to super-blocks with $\geq 3$ chunks. This suggests that the average chunk size for VSH should be around 3*smallest size. Then, a few average chunk sizes around the estimated size for VSH are determined, and the most cost effective size is found.

Classifications

Once the data has been classified into three different classes based on its deduplication characteristics, the next step is to correlate each of these classes with metadata of the files (e.g. filesystem metadata, Hidden, System and Compressed) that are contained in them.

In one embodiment, a popular supervised learning technique called decision tree induction is used for the purpose of classification. A decision tree takes as the input a sample or specimen described by a set of attributes, and provides the predicted classification of the sample as output. The decision making in the decision tree can be seen as a sequence of tests. Each node in the decision tree represents a test of the value of one of the attributes that describe the sample or specimen, and branches from this node correspond to all possible values of this attribute. Leaf nodes of this tree correspond to class labels. The number of nodes in the decision tree depend primarily on the order of usage of attributes. The attributes are ranked based on their usefulness in classification and higher ranked attributes are chosen as nodes higher up in the tree. The rationale here is that stronger attributes help make decisions with lesser number of tests or higher up in the tree, leading shorter paths and on the whole smaller tree. A metric called Information Gain, borrowed from Information Theory, is used for the purpose of ranking of attributes. FIG. 3 shows a small section of the decision tree generated in one example.

Note that the deduplication performing at base deduplication and file categorizing will not actually store the chunks to the storage system. In this embodiment, it is like a deduplication estimator which performs the reads and computations for deduplication and estimates the FF, MO, DT and RT.

On-Line Phase

In the on-line phase, first the classifier from the training phase is applied to a new coming file or an existing non-training file. This step is trivial if a class using its metadata and contents attributes is reached. It is possible that a class based on the classifier and the file's metadata and contents cannot be determined, for example, the file has a type which is not shown in the training set. In this case, it is attempted to deduplicate this file in each class and choose the class with max duplication as its home class. The information on such files can be further used to refine the classifier after we accumulate a sufficient number of such files. For a composite file, it will be first chunked into separate files based on format, and then the classifier is applied to each single file to find the file class and best approach for each single file.

Timing and Placement Determination

At on-line phase, ADS also determines the timing and placement. One simple way to do this is to build a rule engine to make the decision. Examples of rules include 1) if the approach has very short DT like WFH, the client side has enough CPU power and the network bandwidth is small, perform on-line client side deduplication; 2) if the approach has reasonably short DT like VSH with large chunks and the network bandwidth is not a issue, perform on-line storage side deduplication; 3) if the approach has long DT like VSH, and the network and I/O bandwidth are high, off-line storage side deduplication will be a good choice; 4) for a composite file, off-line storage side deduplication would be a good choice for simplicity. The ADS has a Timing and Placement Determinator which queries the performance model (resource utilization) of the algorithm to obtain an estimate of resource requirements. With this knowledge, combined with current system wide resource usage statistics and various SLA requirements in place, the Timing and Placement Determinator determines an optimal timing and placement for the deduplication operation.

Performance Models

For each deduplication algorithm, a performance model is built. The model includes appliance CPU utilization (PM CUA), deduplication bandwidth (PM DB), reconstruct bandwidth (PM RB) and expected folding factor (PM EFF), which can be directly obtained from the experimental results, as well as client CPU utilization (PM CUC), which is induced from PM CUA:

$$PM\ CUC = PM\ CUA * appliance\ CPU\ freq \div client\ CPU\ freq$$

PM CUC can also be obtained through experiments if desired.

System Resource Monitoring

For the purpose of making the timing and placement decision, ADS will continuously monitor the following resource utilization for the whole system: client CPU utilization (SR CUC), appliance CPU utilization (SR CUA), available network bandwidth between client and appliance/storage (SR NB).

SLA Requirements

ADS also supports the user to specify the SLA requirements for the deduplication process in terms of maximum total client CPU utilization (SLA CUC), maximum total appliance CPU utilization (SLA CUA), minimum reconstruct bandwidth (SLA RB) and minimum deduplication bandwidth (SLA DB), and treats the SLA as another constraint besides available system resource in the decision making process. The folding factor is not included in SLA requirement, because the system will maximize the FF under both system resource and SLA constraints.

Decision Making

The decision is made based on the following steps:

1. For a given input file, the module choice (data class) is made by walking through the decision tree with the file's attributes. This choice provides us the close to best FF with least resource requirement.

2. ADS will try to find the timing and placement option which satisfies both system resource and SLA constraints (if any) given the performance model of the module; if found, the process is complete.

3. If no such option exists, ADS will downgrade the chosen algorithm to a lower level one which generates smaller FF but with less resource requirement, go back to step 2.

Figure 9:
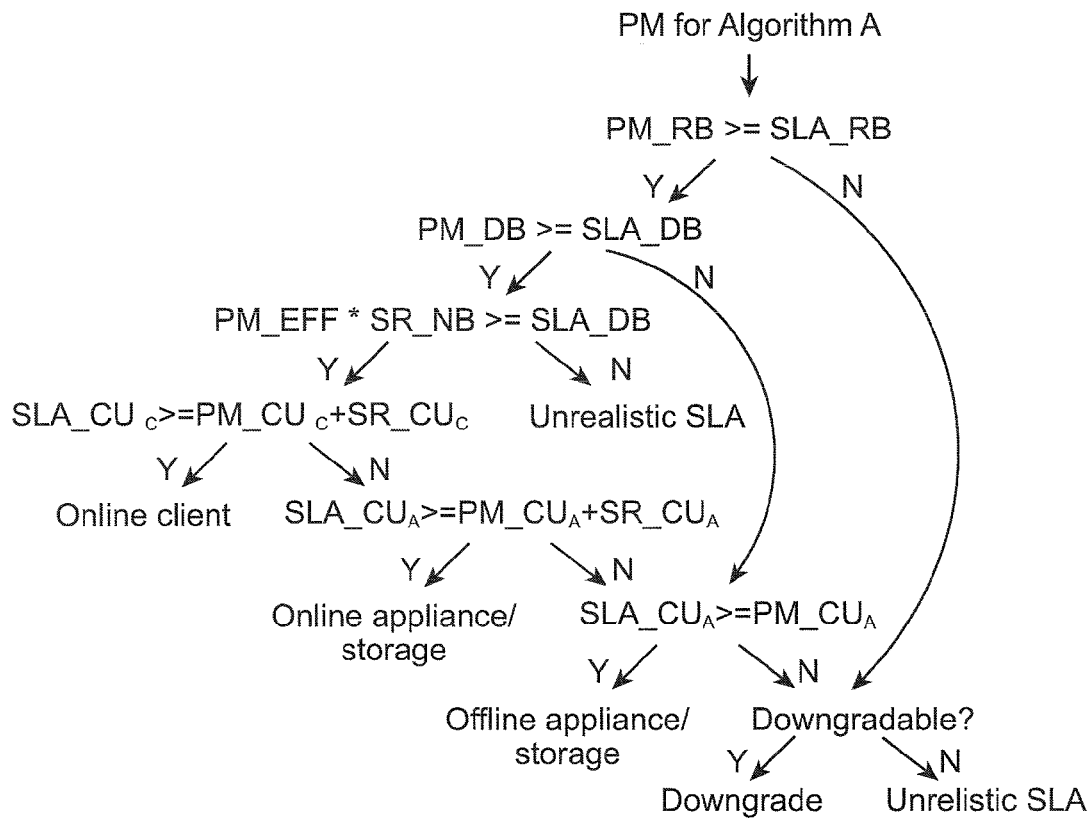
FIG. 9 illustrates a decision model for timing and placement according to one embodiment of the invention.

The order of downgrading algorithm is obvious: V SH→FSH→WFH. If no timing and placement option is found even after downgrading to WFH, it means the SLA requirements are not realistic, for example, SLA DB>PM EFF*SR NB. For unrealistic SLA, ADS will just take the best effort. After step 1—Determination of optimal deduplication algorithm as described above, the next step is to determine the placement and timing decision. In this step, for the chosen algorithm A, first we get the performance model (PM) for A, then use the decision model shown in FIG. 9 to find the timing and placement option, or downgrade the algorithm, or conclude the SLA is unrealistic.

Continuous Refinement

The system will also continuously evolve itself from the following aspects:

1. Performance Model Refinement

The system monitors in ADS continuously monitor not only the system resource utilization for making timing and placement decisions, but the performance numbers (including CPU utilization, deduplication bandwidth, reconstruct bandwidth and folding factor) for different algorithms. These performance numbers will be used to refine the performance models. Recall that the initial performance models are based on the off-line appliance/storage-side deduplication experiments in certain system configuration and resource utilization. The continuous performance monitoring can provide more accurate information on on-line deduplication and on current configuration and resource utilization.

2. Classification Refinement

The initial classification based on the training set may not be accurate enough due to limited training set size, for example, some types of files are originally classified into the no-deduplication class may be able to deduplicate with some files using WFH as new files enter the system. To handle this problem, the system will simulate other deduplication algorithms (only find the folding factor without really re-chunk) for each class other than the specific one at background whenever the resource is available. If for some files in a class, another algorithm continuously provides significantly better folding factor than the specific one for this class, which indicates misclassification of these files, the decision tree will be modified for better classification based on the information that these files should have been classified into a different class. For these already misclassified files, the system will re-chunk them using the better algorithm at background for better redundancy reduction.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer-readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for adaptive deduplication of stored data objects, comprising:
   retrieving a first portion of a plurality of stored objects from at least one storage device;
   performing a base type deduplication estimation process on the first portion of stored objects, resulting in an estimation of a first plurality of deduplication chunk portions of the first portion of stored objects;
   categorizing the first portion of the plurality of stored objects into deduplication sets based on a deduplication relationship of each object of the plurality of stored objects with each of the estimated first plurality of deduplication chunk portions;
   combining deduplication sets into one or more broad classes based on deduplication characteristics of the objects in the deduplication sets;
   building classifiers for each one or more broad classes using metadata attributes and content attributes of each object of the first portion of the plurality of stored objects and classifying a second portion of the plurality of stored objects into one or more broad classes using the classifiers; and
   selecting an appropriate deduplication approach for each categorized class and using a chunk portion size threshold for narrowing down a chunk size for a Variable Chunk Size Hashing class.

2. The method of claim 1, further comprising determining the timing and placement to perform each selected deduplication approach for each classified broad class.

3. The method of claim 2, wherein determining the timing and placement includes on-line at deduplication client side, on-line at appliance/storage side or off-line at appliance/storage side, in a system set based on usage and availability of system resources, service level agreement requirement and resource requirement for each appropriate deduplication process.

4. The method of claim 3, further comprising:
   performing each deduplication approach on each corresponding classified broad class, resulting in a second plurality of deduplication chunk portions of the plurality of stored objects; and
   storing the second plurality of deduplication chunk portions in a storage sub-system.

5. The method of claim 1, wherein classifying one or more broad classes is self-refining over time.

6. The method of claim 1, wherein categorizing the deduplication sets further categorizing without cross-set redundancies of sets.

7. The method of claim 1, wherein the one or more broad classes comprise No-Deduplication, whole file hashing and Variable Chunk Size Hashing.

8. The method of claim 1, wherein the chunk size portion threshold is used to reduce the chunk size search space for the Variable Chunk Size Hashing class, and the chunk size portion threshold is based on a percentage of chunk portions that form super-block chunk sizes greater or equal to n+1, where n is a positive whole number.

9. The method of claim 2, further comprising:
   continuously monitoring the current decision for deduplication approach, timing and placement, replacing it with a better decision if existing, and rechunking the existing chunks using the selected better decision in the background; and
   continuously refine a performance model for resource utilization estimation and refine the classification for broad classes.

10. A system for adaptive deduplication of stored objects, comprising:
    a hardware processor coupled with:
       a base deduplication module configured to perform a base deduplication process on a first portion of a plurality of objects stored on at least one storage device resulting in an estimation of a first plurality of deduplication chunk portions of the first portion of stored objects;
       a clustering module configured to categorize the first portion of the plurality of objects into deduplication sets based on a deduplication relationship of each object of the plurality of stored objects with each of the estimated first plurality of deduplication chunk portions;
       a classifier module configured to combine deduplication sets into one or more broad classes based on deduplication characteristics of the objects in deduplication sets, build classifiers for each of the one or more broad classes using metadata attributes and content attributes of each object of the plurality of objects and classify a second portion of the plurality of objects into one or more broad classes using the classifiers; and
       an adaptive deduplication module configured to select an appropriate deduplication approach for each categorized class and use a chunk portion size threshold for narrowing down chunk size for a Variable Chunk Size Hashing class.

11. The system of claim 10, further comprising a timing and placement determination module configured to determine the timing and placement to perform each selected appropriate deduplication approach for each classified broad class.

12. The system of claim 11, wherein the timing and placement includes
    on-line at deduplication client side,
    on-line at appliance/storage side or off-line at appliance/storage side, in the system based on use and availability of system resources, service level agreement requirement and resource requirement for each adapted deduplication process.

13. The system of claim 12, wherein the adaptive deduplication module is further configured to perform each appropriate deduplication approach on each corresponding classified broad class, resulting in a second plurality of deduplication chunk portions of the plurality of stored objects.

14. The system of claim 10, further comprising:
a monitoring and refining module configured to monitor deduplication history and perform refining and rechunking at background for self-evolving.

15. The system of claim 11, further comprising:
a distributed network including a plurality of storage device sub-systems,
wherein the deduplication module is further configured to perform the appropriate deduplication approach on each classified broad class resulting in a distributed plurality of deduplication chunk portions for each storage device sub-system.

16. A computer program product for adaptive deduplication of storage objects comprising a non-transitory computer usable medium including a computer readable program, wherein the computer readable program when executed on a computer causes the computer to:
retrieve a first portion of a plurality of stored objects from at least one storage device;
perform a base type deduplication estimation process on the first portion of stored objects resulting in an estimation of a first plurality of deduplication chunk portions of the first portion of stored objects;
categorize the first portion of a plurality of stored objects into deduplication sets based on a deduplication relationship;
combine deduplication sets into one or more broad classes based on deduplication characteristics of the objects in deduplication sets;
build classifiers for each of the one or more broad classes using metadata attributes and content attributes of the first portion of the plurality of stored objects and classify a second portion of stored objects into one or more broad classes using the classifiers; and
select an appropriate deduplication approach for each categorized class and use a chunk portion size threshold for narrowing down chunk size for a Variable Chunk Size Hashing class.

17. The computer program product of claim 16, further causing the computer to:
determine the timing and placement to perform each selected appropriate deduplication approach for each classified broad class.

18. The computer program product of claim 17, wherein the timing and placement includes: on-line at deduplication client side, on-line at appliance/storage side or off-line at appliance/storage side, in a system set based on usage and availability of system resources, service level agreement and resource requirement for each appropriate deduplication process; and
each appropriate deduplication approach is performed on each corresponding classified broad class, resulting in a second plurality of deduplication chunk portions of the plurality of stored objects.

19. The computer program product of claim 17, wherein classification of each of the one or more broad classes is self-refining over time.

20. The computer program product of claim 16, wherein the deduplication sets are further categorized without cross-set redundancies of deduplication sets.

* * * * *